(12) United States Patent
Kim et al.

(10) Patent No.: US 11,360,336 B2
(45) Date of Patent: Jun. 14, 2022

(54) PRIVACY PROTECTION FILM AND LIQUID CRYSTAL DISPLAY DEVICE INCLUDING THE SAME

(71) Applicant: LG Display Co., Ltd., Seoul (KR)

(72) Inventors: Seong-Il Kim, Paju-si (KR); Sooyoun Kim, Seoul (KR); Junehwan Kim, Seoul (KR); Seokho Lee, Paju-si (KR); Youngwook Ha, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/131,193

(22) Filed: Dec. 22, 2020

(65) Prior Publication Data
US 2021/0200002 A1    Jul. 1, 2021

(30) Foreign Application Priority Data
Dec. 31, 2019    (KR) .................. 10-2019-0179897

(51) Int. Cl.
| G02F 1/13 | (2006.01) |
| G02F 1/1335 | (2006.01) |
| G02F 1/1334 | (2006.01) |
| G02B 5/02 | (2006.01) |
| F21V 8/00 | (2006.01) |
| G02F 1/13357 | (2006.01) |

(52) U.S. Cl.
CPC .......... *G02F 1/1323* (2013.01); *G02F 1/1334* (2013.01); *G02F 1/133504* (2013.01); *G02B 5/0215* (2013.01); *G02B 5/0247* (2013.01); *G02B 5/0278* (2013.01); *G02B 6/0051* (2013.01); *G02B 6/0053* (2013.01); *G02F 1/133606* (2013.01)

(58) Field of Classification Search
CPC ................ G02F 1/1323; G02F 1/1334; G02F 1/133606; G02F 1/133504; G02F 2001/133607; H04N 2013/403; G02B 6/0051; G02B 5/0247; G02B 5/0215; G02B 5/0242; G02B 5/0268; G02B 5/0278; G02B 6/0053
See application file for complete search history.

(56) References Cited

U.S. PATENT DOCUMENTS

| 6,661,488 B1 * | 12/2003 | Takeda .................. G02F 1/1393 349/117 |
| 7,542,120 B2 * | 6/2009 | Mizusako ......... G02F 1/133707 349/142 |

(Continued)

FOREIGN PATENT DOCUMENTS

| KR | 10-2008-0000987 A | 1/2008 |
| KR | 10-2009-0087570 A | 8/2009 |

*Primary Examiner* — Michael H Caley
*Assistant Examiner* — Jonathan Y Jung
(74) *Attorney, Agent, or Firm* — Birch, Stewart, Kolasch & Birch, LLP

(57) ABSTRACT

Provided is a privacy protection film. The privacy protection film includes a transparent base substrate, a light control layer disposed on the transparent base substrate and including a plurality of optical pattern structures each having an upwardly protruding prism shape, a first electrode disposed on the light control layer, a second electrode spaced apart from the first electrode, and a variable light diffusion layer disposed between the first electrode and the second electrode and formed of a polymer dispersed liquid crystal (PDLC).

8 Claims, 10 Drawing Sheets

(56) References Cited

U.S. PATENT DOCUMENTS

| | | | | |
|---|---|---|---|---|
| 2001/0046010 A1* | 11/2001 | Kamijyo | ............ | G02F 1/133504 |
| | | | | 349/112 |
| 2005/0041174 A1* | 2/2005 | Numata | ............ | G02F 1/133621 |
| | | | | 349/61 |
| 2007/0110386 A1* | 5/2007 | Chiang | ............... | G02B 5/0278 |
| | | | | 385/147 |
| 2011/0310085 A1* | 12/2011 | Mimura | ............... | G09G 3/2003 |
| | | | | 345/214 |
| 2014/0340930 A1* | 11/2014 | Nakagome | ............ | G02B 6/0025 |
| | | | | 362/607 |
| 2015/0022746 A1* | 1/2015 | Ichihashi | ............... | G02B 30/27 |
| | | | | 349/15 |
| 2016/0054600 A1* | 2/2016 | Chung | ............... | G01N 21/958 |
| | | | | 356/369 |
| 2018/0210243 A1* | 7/2018 | Fang | ................... | G02B 6/0055 |
| 2019/0108786 A1* | 4/2019 | Lee | ..................... | G02B 5/0278 |
| 2019/0317344 A1* | 10/2019 | Meshkat Mamalek | ... | E06B 9/24 |

* cited by examiner

PRIVACY PROTECTION FILM AND LIQUID CRYSTAL DISPLAY DEVICE INCLUDING THE SAME

CROSS-REFERENCE TO RELATED APPLICATIONS

This application claims the priority and benefit of Korean Patent Application No. 10-2019-0179897 filed on Dec. 31, 2019, in the Korean Intellectual Property Office, the entire contents of which are hereby expressly incorporated by reference into the present application.

BACKGROUND

Technical Field

The present disclosure relates to a privacy protection film and a liquid crystal display device including the same, and more particularly, to a privacy protection film capable of providing a security mode that provides a narrow viewing angle and a share mode that provides a wide viewing angle, and a liquid crystal display device including the same.

Description of the Related Art

A liquid crystal display (LCD) device is a display device that implements an image in a manner of controlling transmittance of light generated from a light source by controlling an arrangement of liquid crystals through disposing the light source under the liquid crystals and applying an electric field to the liquid crystals. Such a liquid crystal display device is applied to various electronic apparatuses such as smartphones, tablet PCs, and the like. The liquid crystal display device includes a liquid crystal display panel disposed above a backlight unit including a light source.

Meanwhile, as the demand for personal privacy protection has increased in recent years, various related products have been developed. Among the products for ensuring personal privacy, the demand for privacy protection devices which are attached to various display devices such as mobile phones, tablet PCs, and monitors to thereby block side transmission of light and narrow a viewing angle is increasing every year.

In this regard, in the related art, a privacy protection device using a narrow viewing angle filter that is attached to a front surface of a display device has been used. More specifically, a privacy protection device in the form of an adhesive film, in which a light transmission area that transmits light and a light blocking area that blocks light in a specific direction are alternately formed, has been used.

The privacy protection device in the form of an adhesive film, includes a lower film, an upper film, and a viewing angle control filter disposed between the lower film and the upper film. The viewing angle control filter includes light transmission areas and a light blocking area disposed between the light transmission areas to block or absorb light. The light blocking area uses a black dye and blocks light having an incident angle equal to or greater than a predetermined angle among light incident from a bottom thereof. Therefore, the light having an incident angle equal to or greater than a predetermined angle does not pass through the viewing angle control filter and thus, light transmittance is significantly reduced at a viewing angle equal to or greater than a predetermined angle, so that privacy protection can be implemented.

However, in the case of the privacy protection device using the attached narrow viewing angle filter described above, since the viewing angle cannot be restored to a pre-existing state unless the privacy protection device itself is removed, it is inconvenient to remove the privacy protection device itself when a privacy function is unnecessary.

SUMMARY

An object to be achieved by the present disclosure is to provide an improved privacy protection film capable of selectively switching between a share mode and a security mode as needed without removing a privacy protection device itself from a display panel.

Another object to be achieved by the present disclosure is to quickly switch a security mode and a share mode and improve driving stability.

Another object to be achieved by the present disclosure is to provide unique visibility, simultaneously with improving transmittance, through viewing angle control in a manner of reflecting external light.

Another object to be achieved by the present disclosure is to provide a privacy protection film capable of not only controlling viewing angles in two directions such as leftward and rightward directions, but capable of controlling viewing angles in four or various directions such as upward, downward, leftward, and rightward directions.

Objects of the present disclosure are not limited to the above-mentioned objects, and other objects, which are not mentioned above, can be clearly understood by those skilled in the art from the following descriptions.

According to an aspect of the present disclosure, a privacy protection film can include a transparent base substrate; a light control layer disposed on the transparent base substrate and including a plurality of optical pattern structures each having an upwardly protruding prism shape; a first electrode disposed on the light control layer; a second electrode spaced apart from the first electrode; and a variable light diffusion layer disposed between the first electrode and the second electrode and formed of a polymer dispersed liquid crystal (PDLC).

According to another aspect of the present disclosure, a privacy protection film can include a first transparent substrate and a second transparent substrate facing the first transparent substrate; a first electrode on the first transparent substrate; a second electrode on a lower surface of the second transparent substrate; a plurality of optical pattern structures disposed on the first electrode and formed of a transparent material; a polymer filling a space between the first electrode and the second electrode; and droplets including liquid crystal molecules dispersed in the polymer.

Other detailed matters of the exemplary embodiments are included in the detailed description and the drawings.

According to the present disclosure, a privacy protection film that can freely switch between a share mode providing a wide viewing angle and a security mode providing a narrow viewing angle as needed, can be provided.

According to the present disclosure, through viewing angle control in a manner of reflecting external light, unique visibility can be provided when driving the security mode, and at the same time, improvements in an overall transmittance can be achieved.

According to the present disclosure, a privacy protection film with improved luminance overall and a fast speed of switching between the security mode and the share mode can be provided.

According to the present disclosure, a privacy protection film capable of not only controlling viewing angles in two directions such as leftward and rightward directions, but controlling viewing angles in four directions such as upward, downward, leftward, and rightward directions, when driving the security mode, can be provided.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1A:
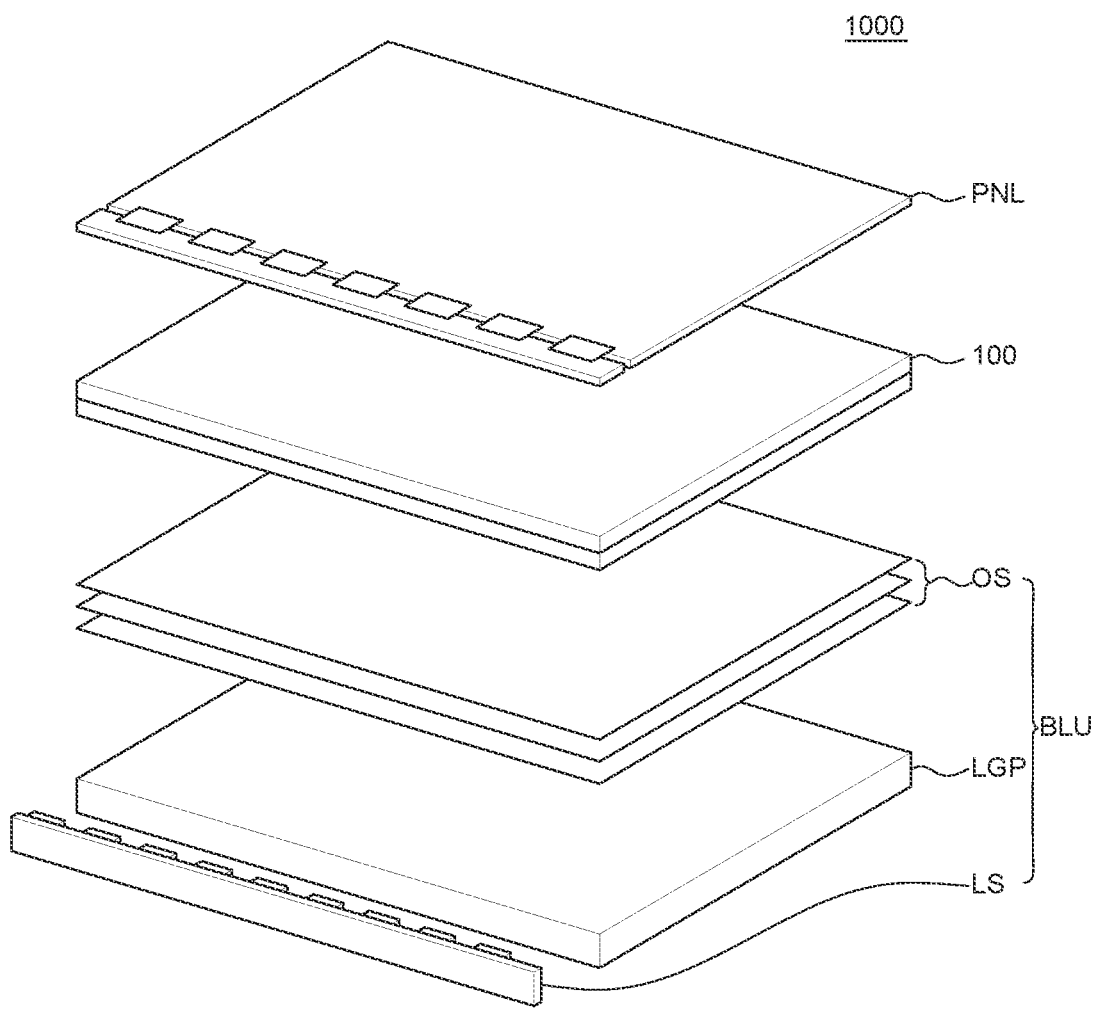
FIG. 1A is a schematic exploded perspective view illustrating a liquid crystal display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies can be omitted to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "above", "below", and "next", one or more parts can be positioned between the two parts unless the terms are used with the term "immediately" or "directly".

When an element or layer is disposed "on" another element or layer, another layer or another element can be interposed directly on the other element or therebetween.

Although the terms "first", "second", and the like are used for describing various components, these components are not confined by these terms and may not define order. These terms are merely used for distinguishing one component from the other components. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a liquid crystal display device according to exemplary embodiments of the present disclosure will be described in detail with reference to accompanying drawings. All the components of the liquid crystal display device according to all embodiments of the present disclosure are operatively coupled and configured.

FIG. 1A is a schematic exploded perspective view illustrating a liquid crystal display device according to an exemplary embodiment of the present disclosure.

Referring to FIG. 1A, a liquid crystal display device 1000 according to an exemplary embodiment of the present disclosure includes a backlight unit BLU, a privacy protection film 100, and a liquid crystal display panel PNL.

The backlight unit BLU supplies light to the liquid crystal display panel PNL disposed thereabove. The backlight unit BLU includes light sources LS, a light guide plate LGP, and an optical sheet OS. The backlight unit BLU is an edge type backlight unit in which the optical sheet OS is disposed on the light guide plate LGP, and a plurality of the light sources LS are disposed on a side surface of the light guide plate LGP. However, the present disclosure is not limited thereto, and the backlight unit BLU can be configured in a direct type.

The light sources LS are disposed on the side surface of the light guide plate LGP and irradiate light to the light guide plate LGP. As the light sources LS, a light emitting diode (LED), a cold cathode fluorescent lamp (CCFL), an external electrode fluorescent lamp, or the like can be used, but the present disclosure is not limited thereto.

The light guide plate LGP supplies a uniform surface light source to the liquid crystal display panel PNL by converting a traveling direction of light incident from the side surface thereof. The light incident from the side surface of the light guide plate LGP spreads evenly while traveling in the light guide plate LGP through total reflection, so that the light guide plate LGP can supply a uniform surface light source.

The optical sheet OS is disposed on the light guide plate LGP and diffuses or collects light passing through the light sources LS and the light guide plate LGP, thereby allowing a uniform surface light source to be incident on the liquid crystal display panel PNL. The optical sheet OS can be composed of a plurality of sheets including a diffusion sheet, a prism sheet, and a protective sheet, but is not limited thereto.

The liquid crystal display panel PNL displays an image by adjusting a light transmittance of liquid crystals. The liquid crystal display panel PNL includes an upper substrate and a lower substrate that face each other, and a liquid crystal layer between the upper substrate and the lower substrate.

In the lower substrate, a plurality of gate lines and data lines intersect to define pixels, and a thin film transistor is provided at each intersection of the pixels to be connected to a pixel electrode formed in each pixel. In the upper substrate, a black matrix for covering color filters and the gate lines, the data lines or the thin film transistor is provided.

In addition, polarizing films can be disposed on front and rear surfaces of the liquid crystal display panel PNL.

A driving unit for driving the liquid crystal display panel PNL is disposed along one side of the liquid crystal display panel PNL. The driving unit includes various ICs such as a gate driver IC or a data driver IC, driving circuits and the like, and can apply signals to the gate lines and data lines. In this case, the driving unit is electrically connected to the liquid crystal display panel PNL through a connection member, and the connection member can be a chip on film (COF) or a tape carrier package (TCP).

The privacy protection film 100 is disposed between the optical sheet OS and the liquid crystal display panel PNL. The privacy protection film 100 is a switchable privacy protection film that can selectively adjust a viewing angle according to the application of an electrical signal. The privacy protection film 100 can provide a security mode by providing a narrow viewing angle so that an image displayed on the liquid crystal display device 1000 is visible to a user, and can provide a share mode which provides a wide viewing angle so that the image is visible to other people around the user. Hereinafter, the privacy protection film 100 will be described in detail with reference to FIG. 1B.

Figure 1B:
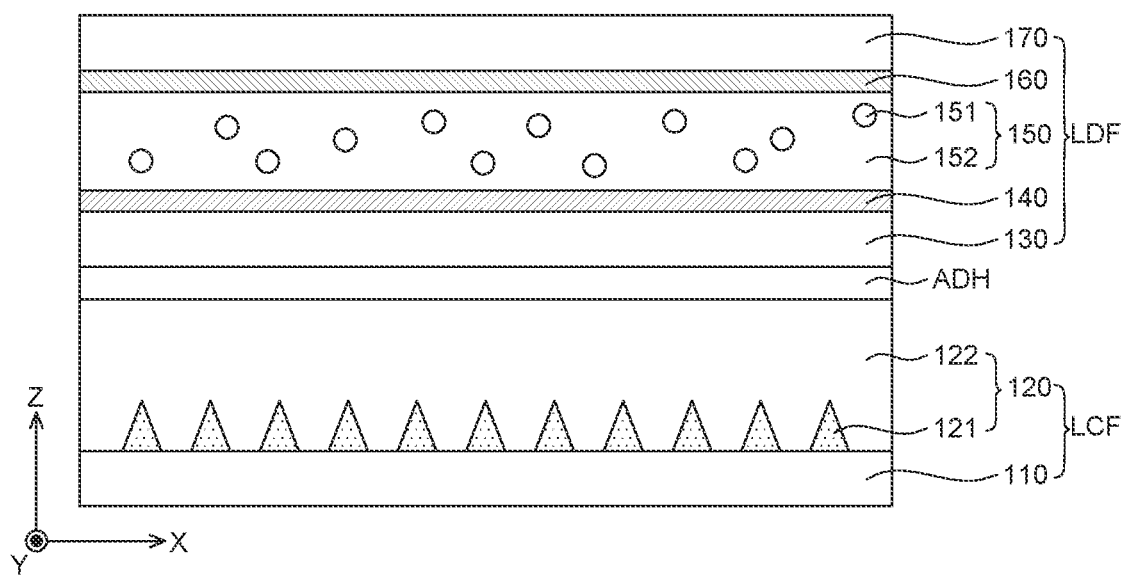
FIG. 1B is a cross-sectional view illustrating a privacy protection film according to an exemplary embodiment of the present disclosure.

FIG. 1B is a cross-sectional view illustrating a privacy protection film according to an exemplary embodiment of the present disclosure.

Referring to FIG. 1B, the privacy protection film 100 used in the liquid crystal display device 1000 according to an exemplary embodiment of the present disclosure includes a light control film LCF, an adhesive member ADH, and a variable light diffusion film LDF.

The light control film LCF is a film that controls transmission of internal light emitted from the backlight unit BLU and reflection of external light incident from the outside of the liquid crystal display device 1000. More specifically, the light control film LCF passes the internal light emitted from the backlight unit BLU in an upper direction, and reflects external light that is incident onto the light control film LCF at an incident angle equal to or greater than a predetermined angle among the external light incident from the outside of the liquid crystal display device 1000. Thus, it is feasible to provide specific reflective visibility at a viewing angle equal to or greater than a predetermined angle. That is, the light control film LCF can function as a structural color film having structural coloration.

The light control film LCF includes a base substrate 110 and a light control layer 120.

The base substrate 110 serves to support and protect various components of the privacy protection film 100. The base substrate 110 can be formed of a transparent glass or plastic material. The base substrate 110 can be formed of polyimide (PI), polyethylene terephthalate (PET), polyethylene naphthalate (PEN) or polycarbonate (PC), which has flexibility, but is not limited thereto.

The light control layer 120 is disposed on the base substrate 110. The light control layer 120 is a layer that controls whether to transmit the internal light emitted from the backlight unit BLU and whether to reflect the external light incident from the outside of the liquid crystal display device 1000. In addition, the light control layer 120 controls the amount of transmission of the internal light emitted from the backlight unit BLU and the amount of reflection of the external light incident from the outside of the liquid crystal display device 1000. Specifically, the light control layer 120 transmits internal light emitted from the backlight unit in the upward direction and reflects external light incident onto the light control film at an incident angle equal to or greater than a predetermined angle.

The light control layer 120 includes a plurality of optical pattern structures 121 and an air layer 122.

The plurality of optical pattern structures 121 are disposed on the base substrate 110. The optical pattern structures 121 pass the internal light emitted from the backlight unit BLU disposed on a lower surface of the privacy protection film 100, in an upward direction. In addition, the optical pattern structures 121 reflect light incident at an incident angle equal to or greater than a predetermined angle, among external light incident on an inside of the privacy protection film 100 through the liquid crystal display panel PNL from the outside of the liquid crystal display device 1000. Therefore, the internal light emitted from the backlight unit BLU passes through the privacy protection film 100 and is emitted to the outside of the liquid crystal display device 1000 to thereby be viewed by a user's eyes. In addition, at a viewing angle equal to or greater than a predetermined angle from the outside of the liquid crystal display device 1000, specific reflective visibility can be felt by the optical pattern structures 121 of the privacy protection film 100.

The optical pattern structures 121 have a shape of a plurality of prisms protruding upwardly. Each of the plurality of optical pattern structures 121 can be an island-type prism having a pyramid shape which protrudes upwardly, or an island-type prism having a truncated pyramid shape which protrudes upwardly. In addition, the optical pattern structure 121 can be a rod-type prism which protrudes upwardly and has a triangular cross-sectional shape, or a rod-type prism which protrudes upwardly and includes a trapezoidal cross-sectional shape. The plurality of optical pattern structures 121 are described with reference to FIGS. 2A to 2D.

FIGS. 2A to 2D are schematic perspective views illustrating optical pattern structures constituting the privacy protection film according to various examples of the present disclosure.

Figure 2A:
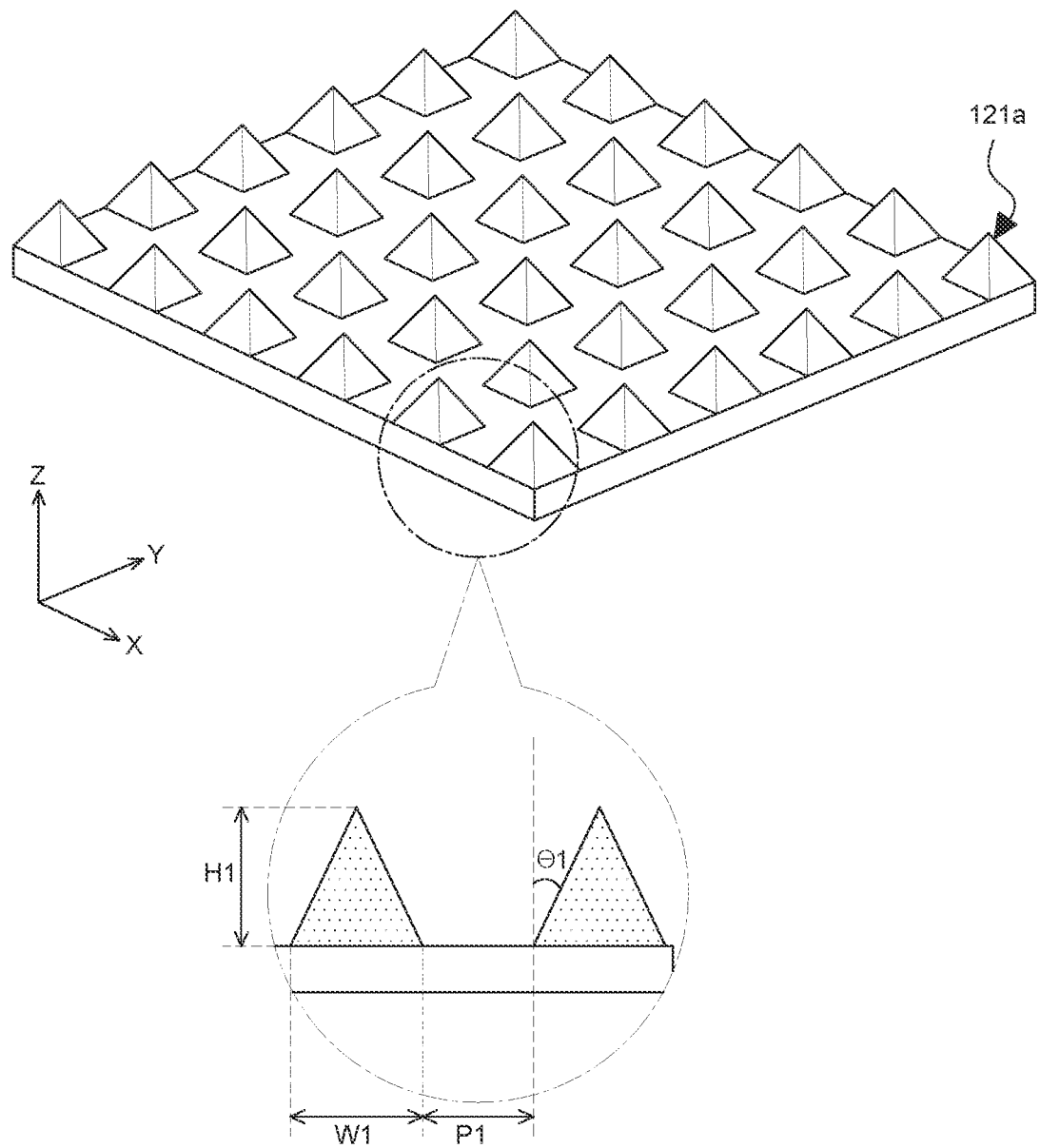
FIGS. 2A to 2D are schematic perspective views illustrating optical pattern structures constituting the privacy protection film according to an exemplary embodiment of the present disclosure.

FIG. 2A is a perspective view of first optical pattern structures 121a for explaining the shape of the optical pattern structures 121 shown in FIG. 1B. Referring to FIG. 2A, each first optical pattern structure 121a is an island-type prism has a pyramid shape. The first optical pattern structure 121a protrudes upwardly from the base substrate 110 and has a shape of a quadrangular pyramid having four inclined surfaces, at least one surface of which forms a predetermined angle with a Z-axis. In this case, inclinations of the four inclined surfaces can be identical to each other.

The respective first optical pattern structures 121a are spaced apart from each other at regular intervals in a horizontal direction (an X-axis direction) and a vertical direction (a Y-axis direction) to be arranged in parallel.

The respective first optical pattern structures 121a have a height "H1" and a width "W1" and are disposed to be spaced apart from each other at a specific interval of "P1". Although not limited thereto, the first optical pattern structures 121a preferably have a height of 100 nm to 200 nm, a width of 100 nm to 200 nm, and an interval of 100 nm to 200 nm. When a shape of each first optical pattern structure 121a satisfies the above ranges, an overall transmittance of the privacy protection film 100 is excellent, and the light emitted from the backlight unit BLU disposed under the privacy protection film 100 can go straight to the outside of the liquid crystal display device 1000 and can provide specific reflective visibility at a viewing angle equal to or greater than a predetermined angle from the outside of the liquid crystal display device 1000.

Further, each first optical pattern structure 121a can have a taper angle θ1, which is an angle between the Z-axis and the inclined surface, from 3° to 15°. When the taper angle θ1 is less than 3°, a viewing angle limiting function is insufficient, and when the taper angle θ1 is greater than 15°, optical efficiency is lowered and the internal light emitted from the backlight unit BLU disposed under the privacy protection film 100 is scattered, thereby decreasing the overall transmittance and luminance.

The optical pattern structures 121 are formed of a material having high light transmittance. Specifically, the optical pattern structures 121 can be formed of a thermoplastic resin, a thermosetting resin, an UV curing resin or the like. Such a resin can be formed of a transparent material such as cellulose, polyolefin, a polyester resin, polystyrene, polyurethane, polyvinyl chloride, polyacrylic, or polycarbonate, but is not limited thereto. In addition, the optical pattern structures 121 can be formed of the same material as the base substrate 110.

FIGS. 1B and 2A illustrate that the optical pattern structures 121 are separately disposed on the base substrate 110, but the optical pattern structures 121 can be integrated with the base substrate 110. For example, when the optical pattern structures 21 are integrally formed with the base substrate 110, the transparent structures can be an unevenness pattern in which pyramid-shaped convex portions, and concave portions corresponding to the convex portions are repeatedly arranged. That is, in FIG. 2A, the respective optical pattern structures 121 disposed on the base substrate 110 form convex portions, and spaces between the respective optical pattern structures 121 form concave portions.

The optical pattern structures 121 can be formed on the base substrate 110 by a photolithography process, a master mold process, an imprinting process, and other physical processing methods, and any pattern forming method can be used freely.

The first optical pattern structure 121a transmits internal light incident perpendicularly onto a plane of the base substrate 110 from the lower surface of the privacy protection film 100, to the outside of the liquid crystal display device 1000 in a straight direction. In addition, by the inclined surface having the taper angle θ1, the optical pattern structures 121 reflect external light having an incident angle equal to or greater than a predetermined angle among the external light incident on the inside of the privacy protection film 100 from the outside of the liquid crystal display device 1000. Since the first optical pattern structure 121a illustrated in FIG. 2A has four inclined surfaces, it is feasible to reflect external light incident in directions corresponding to the four surfaces of the first optical pattern structure 121a. Therefore, the privacy protection film 100 including the first optical pattern structure 121a can limit viewing angles in four directions.

Figure 2B:
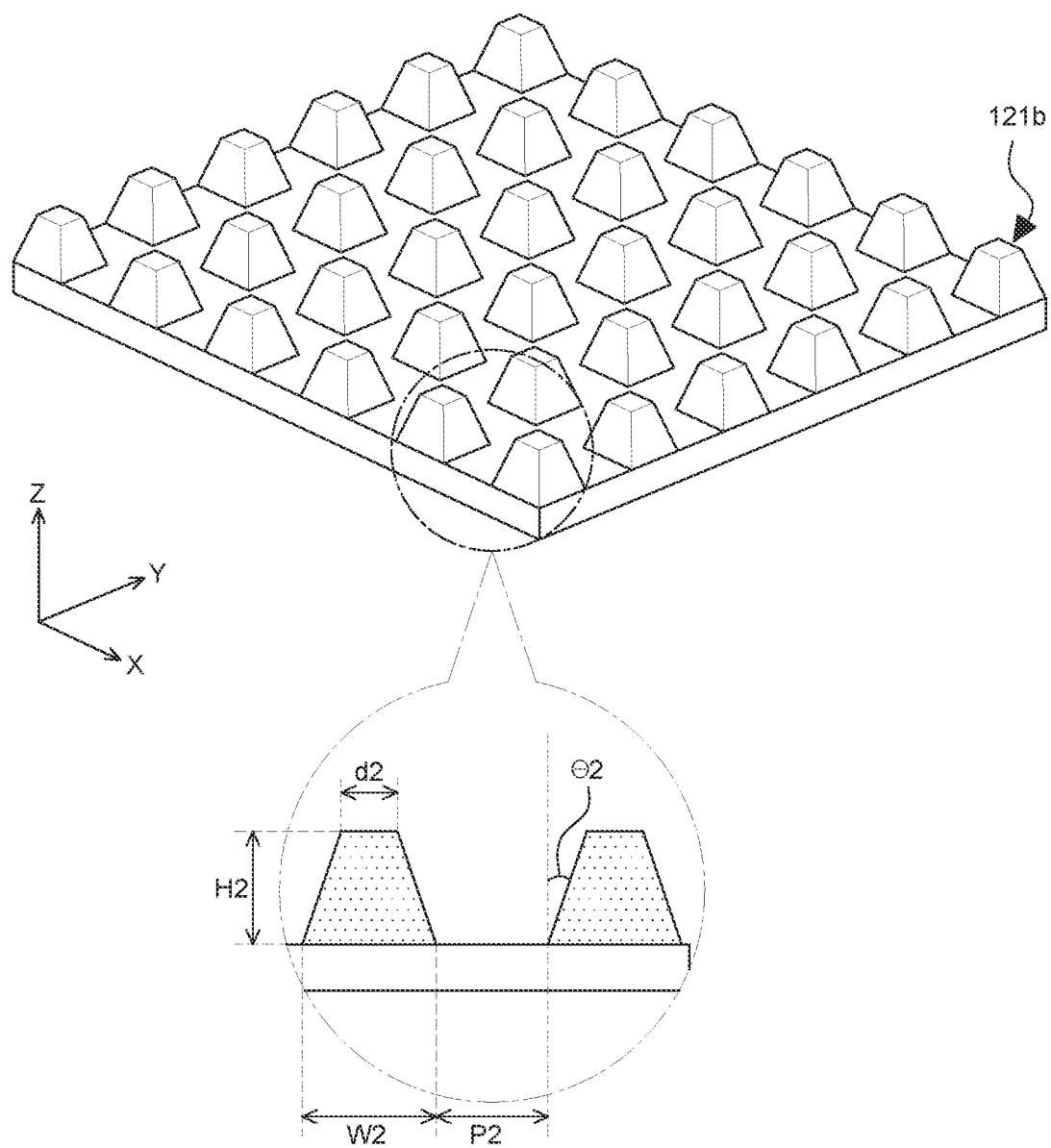

FIG. 2B is a perspective view of second optical pattern structures 121b of the privacy protection film 100 according to another example of the present disclosure. Referring to FIG. 2B, each second optical pattern structure 121b is an island-type prism having a truncated pyramid shape which includes a cut top portion. The second optical pattern structure 121b protrudes upwardly from the base substrate 110, and has four inclined surfaces, at least one surface of which forms a predetermined angle with the Z-axis, and a top surface meeting the four inclined surfaces.

The respective second optical pattern structures 121b have a height of "H2", a bottom surface width of "W2", and a top surface width of "d2" and are disposed to be spaced apart from each other at a specific interval of "P2". Although not limited thereto, the second optical pattern structures 121b preferably have a height H2 of 100 nm to 200 nm, a bottom surface width W2 of 100 nm to 200 nm, and an interval of 100 nm to 200 nm. In this case, the top surface width d2 of the second optical pattern structure 121b having a truncated pyramid shape can be 50 nm to 150 nm. When the shape of each second optical pattern structure 121b satisfies the above ranges, the overall transmittance of the privacy protection film 100 is excellent, and the light emitted from the backlight unit BLU disposed under the privacy protection film 100 can go straight to the outside of the liquid crystal display device 1000 and can provide specific reflective visibility at a viewing angle equal to or greater than a predetermined angle from the outside of the liquid crystal display device 1000.

In addition, each second optical pattern structure 121b can have a taper angle θ2, which is an angle between the Z-axis and one side surface thereof, from 3° to 15°. When the taper angle is less than 3°, the viewing angle limiting function is insufficient, and when the taper angle θ2 is greater than 15°, optical efficiency is lowered and the light emitted from the backlight unit BLU disposed under the privacy protection film 100 is scattered, thereby decreasing the overall transmittance and luminance.

As with the first optical pattern structure 121a shown in FIG. 2A, the second optical pattern structure 121b shown in FIG. 2B has four inclined surfaces, and thus, it is feasible to reflect external light incident in directions corresponding to the four inclined surfaces of the second optical pattern structure 121b. Therefore, the privacy protection film 100 including the second optical pattern structure 121b can limit viewing angles in four directions.

Meanwhile, unlike the first optical pattern structure 121a illustrated in FIG. 2A, the second optical pattern structure 121b illustrated in FIG. 2B has a structure in which a top thereof is cut to thereby form the top surface thereof. By the top surface of the second optical pattern structure 121b, light incident from a bottom portion of the second optical pattern structure 121b by being emitted from the backlight unit BLU can easily pass through the privacy protection film 100 in a straight direction, without being refracted.

Figure 2C:
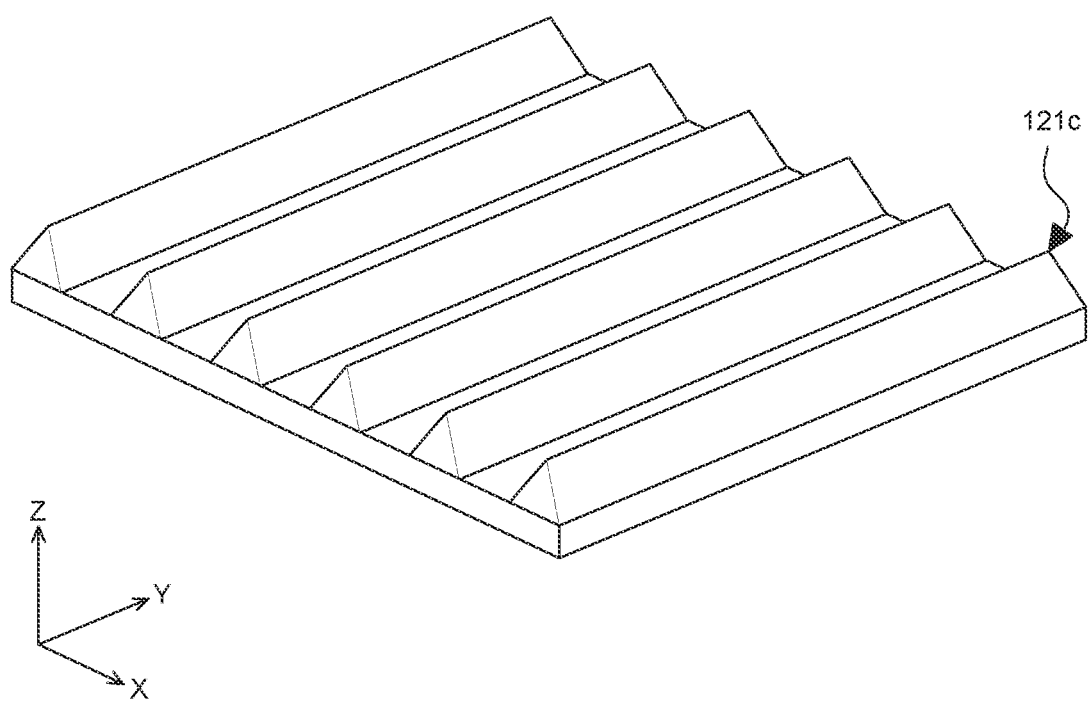

FIG. 2C is a perspective view of third optical pattern structures 121c of the privacy protection film 100 according to another example of the present disclosure. Referring to FIG. 2C, each third optical pattern structure 121c is a rod-type prism having a triangular cross-sectional shape. That is, each third optical pattern structure 121c has a triangular shape in a cross-section and has a structure extending and elongated in a longitudinal direction (a Y-axis direction). A plurality of the third optical pattern structures 121c are spaced apart from each other at regular intervals in a horizontal direction (an X-axis direction) to be arranged in parallel.

The cross-sectional shape of the third optical pattern structure 121c is the same as that of the first optical pattern structure 121a having a pyramid shape shown in FIG. 2A. That is, the respective third optical pattern structures 121c have a height of "H1" and a width of "W1", and are disposed to be spaced apart from each other in the horizontal direction (the X-axis direction) at a specific interval P1. Although not limited thereto, the third optical pattern structures 121c can have a height of 100 nm to 200 nm, a width of 100 nm to 200 nm, and an interval of 100 nm to 200 nm, and can have a taper angle θ1 of preferably, 3° to 15°. However, contents overlapping those described in FIG. 2A will be omitted.

Unlike the first optical pattern structure 121a illustrated in FIG. 2A, the third optical pattern structure 121c illustrated in FIG. 2C has two inclined surfaces. Therefore, the third optical pattern structure 121c can reflect external light incident in directions corresponding to the two inclined surfaces. Therefore, the privacy protection film 100 including the third optical pattern structure 121c can limit viewing angles in two directions.

Figure 2D:
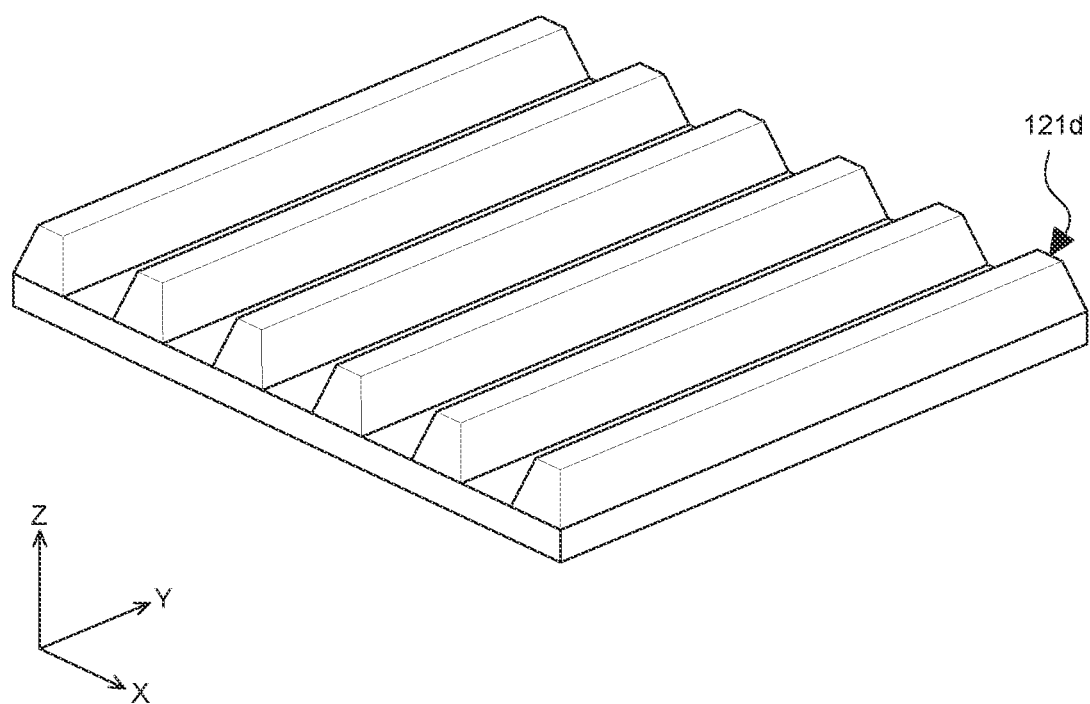

FIG. 2D is a perspective view of fourth optical pattern structures 121d of the privacy protection film 100 according to another example of the present disclosure. Referring to FIG. 2D, each fourth optical pattern structure 121d is a rod-type prism having a trapezoidal cross-sectional shape. That is, each fourth optical pattern structure 121d has a trapezoidal shape in cross section and has a structure extending and elongated in a longitudinal direction (a Y-axis direction). A plurality of the fourth optical pattern structures 121d are spaced apart from each other at regular intervals in a horizontal direction (an X-axis direction) to be arranged in parallel.

The cross-sectional shape of the fourth optical pattern structure 121d is the same as that of the second optical pattern structure 121b having a truncated pyramid shape shown in FIG. 2B. That is, the respective fourth optical pattern structures 121d have a height of "H2", a bottom surface width of "W2", and a top surface width of "d2", and are disposed to be spaced apart from each other at a specific interval of "P2". Although not limited thereto, the fourth optical pattern structures 121d can have a height H2 of 100 nm to 200 nm, a bottom surface width W2 of 100 nm to 200 nm, a top surface width d2 of 50 nm to 150 nm, and an interval of 100 nm to 200 nm, and can have a taper angle θ2 of preferably, 3° to 15°. However, contents overlapping those described in FIG. 2B will be omitted.

Unlike the second optical pattern structure 121b illustrated in FIG. 2B, the fourth optical pattern structure 121d illustrated in FIG. 2D has two inclined surfaces. Therefore, the fourth optical pattern structure 121d can reflect external light incident in directions corresponding to the two inclined surfaces. Accordingly, the privacy protection film 100 including the fourth optical pattern structure 121d can limit viewing angles in two directions. In addition, unlike the third optical pattern structure 121c illustrated in FIG. 2C, the fourth optical pattern structure 121d illustrated in FIG. 2D has a structure in which a top thereof is cut to thereby form a top surface thereof. By the top surface of the fourth optical pattern structure 121d, light incident from a bottom portion of the fourth optical pattern structure 121d by being emitted from the backlight unit BLU can easily pass through the privacy protection film 100 in a straight direction, without being refracted.

The air layer 122 is formed on the optical pattern structures 121. That is, the light control layer 120 can include the optical pattern structures 121 and the air layer 122. A refractive index of the air layer 122 is generally close to 1, and a refractive index of the optical pattern structures 121 is greater than that of the air. Accordingly, external light incident on the inside of the privacy protection film 100 from the outside of the liquid crystal display device 1000 can be reflected at interfaces between the optical pattern structures 121 and the air layer 122.

Meanwhile, in FIG. 1B, a structure in which the air layer 122 is formed on the optical pattern structures 121 is illustrated, but instead of the air layer 122, an auxiliary optical pattern part can be formed.

The auxiliary optical pattern part is formed on the optical pattern structures 121 to planarize the optical pattern structures 121, so that rigidity of the light control film LCF can be improved. In addition, when the auxiliary optical pattern part is disposed, the auxiliary optical pattern part can serve as a first substrate 130 of the variable light diffusion film LDF, to be described later. That is, the first substrate 130 of the variable light diffusion film LDF is omitted. Since a first electrode 140 of the variable light diffusion film LDF can be disposed on the auxiliary optical pattern part, an overall thickness of the privacy protection film 100 can be reduced.

In addition, by adjusting a refractive index of the auxiliary optical pattern part, transmittance and reflectance of the light control layer 120 can be adjusted. For example, the refractive index of the auxiliary optical pattern part can be less than or equal to the refractive index of the optical pattern structures 121. When the refractive index of the auxiliary optical pattern part is equal to the refractive index of the optical pattern structures 121, an overall transmittance of the light control layer 120 can be improved. In addition, when the refractive index of the auxiliary optical pattern part is less than the refractive index of the optical pattern structures 121, external light incident at an incident angle equal to or greater than a predetermined angle can be reflected by the inclined surfaces of the optical pattern structures 121.

The auxiliary optical pattern part is formed of a material having high light transmittance. The auxiliary optical pattern part can be formed of a material the same as or similar to that of the optical pattern structures 121. The auxiliary optical pattern part can be formed using a thermoplastic resin, a thermosetting resin, a UV curing resin, or the like. The auxiliary optical pattern part can be formed of, for example, a transparent material such as cellulose, polyolefin, a polyester resin, polystyrene, polyurethane, polyvinyl chloride, polyacrylic or polycarbonate, but is not limited thereto.

The variable light diffusion film LDF is disposed on the light control film LCF. The variable light diffusion film LDF is a layer that controls whether to diffuse light that passes through the variable light diffusion film LDF or not, and a degree of diffusion. More specifically, the variable light diffusion film LDF controls the diffusion and straight movement of the internal light emitted from the backlight unit BLU and the external light incident from the outside of the liquid crystal display device 1000. The variable light diffusion film LDF can switch between a security mode having a narrow viewing angle and a share mode having a wide viewing angle through a change in droplets 151 including liquid crystals of the variable light diffusion layer 150.

The variable light diffusion film LDF includes the first substrate 130, a second substrate 170, the first electrode 140, a second electrode 160, and the variable light diffusion layer 150 disposed between the first electrode 140 and the second electrode 160.

The first substrate 130 and the second substrate 170 are base substrates for preventing the variable light diffusion layer 150 from bending or warping and protecting the variable light diffusion layer 150 from an external environment. The first substrate 130 and the second substrate 170 are spaced apart from each other at a predetermined interval and disposed to face each other. The first substrate 130 and the second substrate 170 can be formed of a transparent material. For example, the first substrate 130 and the second substrate 170 can be formed of polycarbonate, but are not limited thereto. In FIG. 1B, the first substrate 130 and the second substrate 170 are illustrated, but can be omitted as necessary.

The first electrode 140 and the second electrode 160 are electrodes for forming an electric field by applying a voltage to the variable light diffusion layer 150. The first electrode 140 and the second electrode 160 are formed of a conductive material. In addition, to ensure transmittance of the privacy protection film 100, the first electrode 140 and the second electrode 160 can be formed of a transparent conductive material such as indium tin oxide (ITO), aluminum doped zinc oxide (AZO), fluorine tin oxide (FTO), PEDOT: PSS, silver-nanowire (AgNW) or the like, but are not limited thereto.

The first electrode 140 is disposed on the first substrate 130, and the second electrode 160 is disposed on a lower surface of the second substrate 170. However, when the first substrate 130 is omitted, the first electrode 140 can be disposed directly on the light control layer 120.

The variable light diffusion layer 150 is disposed between the first electrode 140 and the second electrode 160. The variable light diffusion layer 150 controls whether to diffuse light that passes through the variable light diffusion layer 150 and the degree of diffusion. More specifically, the variable light diffusion layer 150 controls the diffusion and straight movement of the internal light emitted from the backlight unit BLU and the external light incident from the outside of the liquid crystal display device 1000.

The variable light diffusion layer 150 can be formed of a polymer dispersed liquid crystal (PDLC) including a polymer 152 filling a space between the first electrode 140 and the second electrode 160 and droplets 151 including liquid crystal molecules dispersed in the polymer 152.

The liquid crystal molecules are anisotropic materials with long and short axes. The liquid crystal molecules can be a negative liquid crystal or a positive liquid crystal, the arrangement of which is changed by an electric field in a Z-axis direction, but are not limited thereto.

A plurality of the liquid crystal molecules are encapsulated to form the droplets 151. The liquid crystal molecules which are irregularly arranged and the polymer 152 have different refractive indices, so that light scattering occurs at interfaces between the liquid crystal molecules and the polymer 152. Therefore, in a state in which no voltage is applied through the first electrode 140 and the second electrode 160, when light passes between the liquid crystal molecules inside the droplets 151, which are irregularly arranged, and the polymer 152, light scattering occurs at the interfaces therebetween.

However, when a voltage is applied through the first electrode 140 and the second electrode 160, the liquid crystal molecules inside the droplets 151 are uniformly aligned in an electric field direction. Accordingly, a refractive index of the liquid crystal molecules is changed, and a transparent state can be achieved by coinciding the refractive index of the liquid crystal molecules with a refractive index of the polymer.

The variable light diffusion layer 150 is manufactured by mixing liquid crystal molecules and monomers that are changed into the polymer 152 by light such as UV. That is, after light-curable monomers are mixed with the liquid crystal molecules to form mixed liquid crystals, when light is irradiated to the mixed liquid crystals, the monomers are changed into the polymer 152 in a solid state. In this process, the droplets 151 including the liquid crystal molecules are positioned within the polymer 152.

The variable light diffusion layer 150 can have a thickness of 15 μm to 25 μm. When the thickness of the variable light diffusion layer 150 is less than 15 μm, light diffusion effects for internal light and external light are insufficient, so that reflective visibility can be felt when the share mode is driven or viewing angle expanding effects are insufficient. In addition, when the thickness of the variable light diffusion layer 150 is greater than 25 μm, the overall transmittance of the privacy protection film 100 can be lowered when the share mode is operated.

The adhesive member ADH is disposed between the light control film LCF and the variable light diffusion film LDP. The adhesive member ADH can be a light-transparent adhesive such that light emitted from the backlight unit BLU can be passed therethrough while attaching the light control film LCF and the variable light diffusion film LDP. The adhesive member ADH can be formed of, for example, optical clear adhesive (OCA), pressure sensitive adhesive (PSA), or the like, but is not limited thereto. For example, when the adhesive member ADH is formed of OCA, it is possible to control adhesion by adding an additive to the OCA. For example, additives that cause heat, UV, light, chemical reaction and the like can be mixed in the adhesive member ADH, but they are not limited thereto.

The adhesive member ADH can be omitted. For example, when the light control layer 120 of the light control film LCF includes an auxiliary optical pattern part disposed on the optical pattern structures 121, the first electrode 140 of the variable light diffusion film LDF can be directly formed on the auxiliary optical pattern part. In this case, the first substrate 130 of the variable light diffusion film LDF and the adhesive member ADH can be omitted, thereby reducing the overall thickness of the privacy protection film 100.

The privacy protection film according to an exemplary embodiment of the present disclosure provides a switchable privacy protection film capable of selectively adjusting a viewing angle according to the application of an electrical signal. Specifically, the privacy protection film according to an exemplary embodiment of the present disclosure can provide a security mode by providing a narrow viewing angle in such a manner that an image displayed on a display device can be viewed only to a user, and can provide a share mode that provides a wide viewing angle in such a manner that the image can be viewed to other people around the user. The privacy protection film according to an exemplary embodiment of the present disclosure can freely switch between the security mode and the share mode as necessary. In addition, unlike a conventional privacy device that alternately arranges light transmission areas and light blocking areas to limit a viewing angle, the privacy protection film according to an exemplary embodiment of the present disclosure can use the light control layer including the optical pattern structures and the variable light diffusion layer including the polymer dispersed liquid crystal, whereby specific reflective visibility at a viewing angle equal to or greater than a predetermined angle can be felt, thereby limiting a viewing angle.

In particular, in the case of a related privacy device where a light blocking area is formed using a light absorbing material such as a black material, there is a problem in which an overall transmittance of the privacy device is lowered by the light blocking area. However, since the privacy protection film according to an exemplary embodiment of the present disclosure limits a viewing angle in such a manner as to provide reflective visibility at a specific viewing angle, it is advantageous in that the security mode can be implemented without a lowering in the overall transmittance.

A method of providing a security mode and a share mode by the privacy protection film according to an exemplary embodiment of the present disclosure will be described with reference to FIGS. 3A and 3B.

Figure 3A:
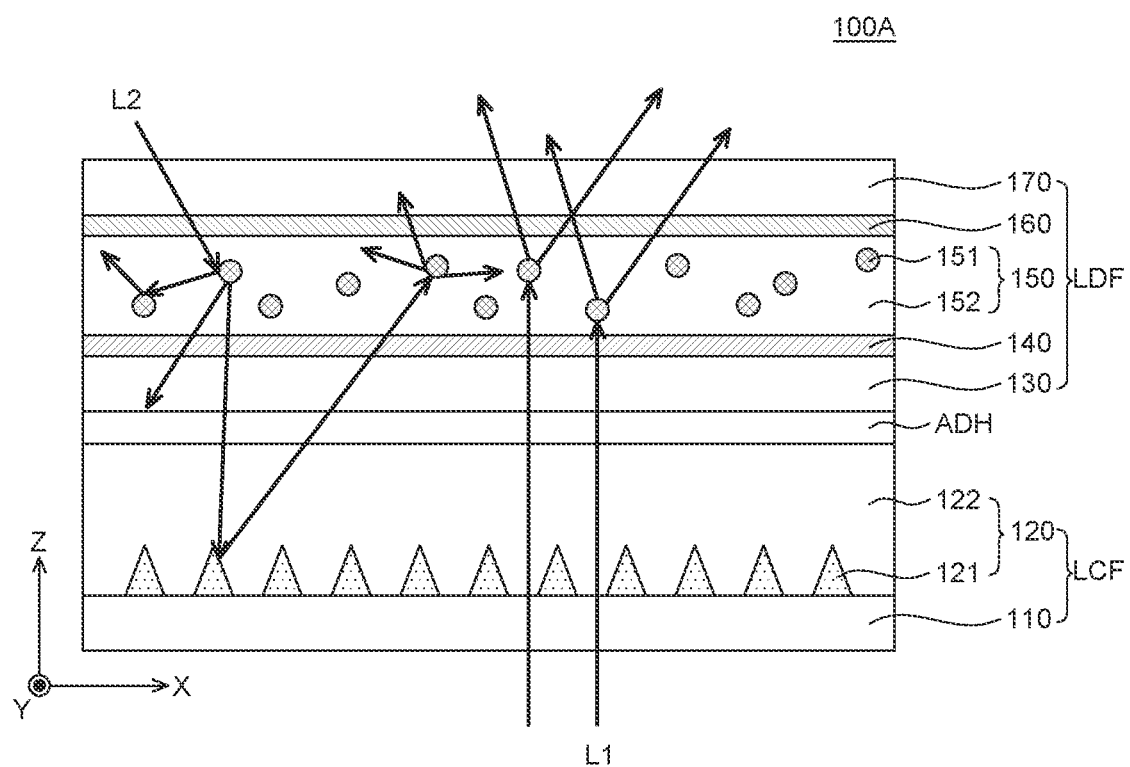
FIGS. 3A and 3B are cross-sectional views illustrating a share mode and a security mode when driving a privacy protection film according to an exemplary embodiment of the present disclosure.
Figure 3B:
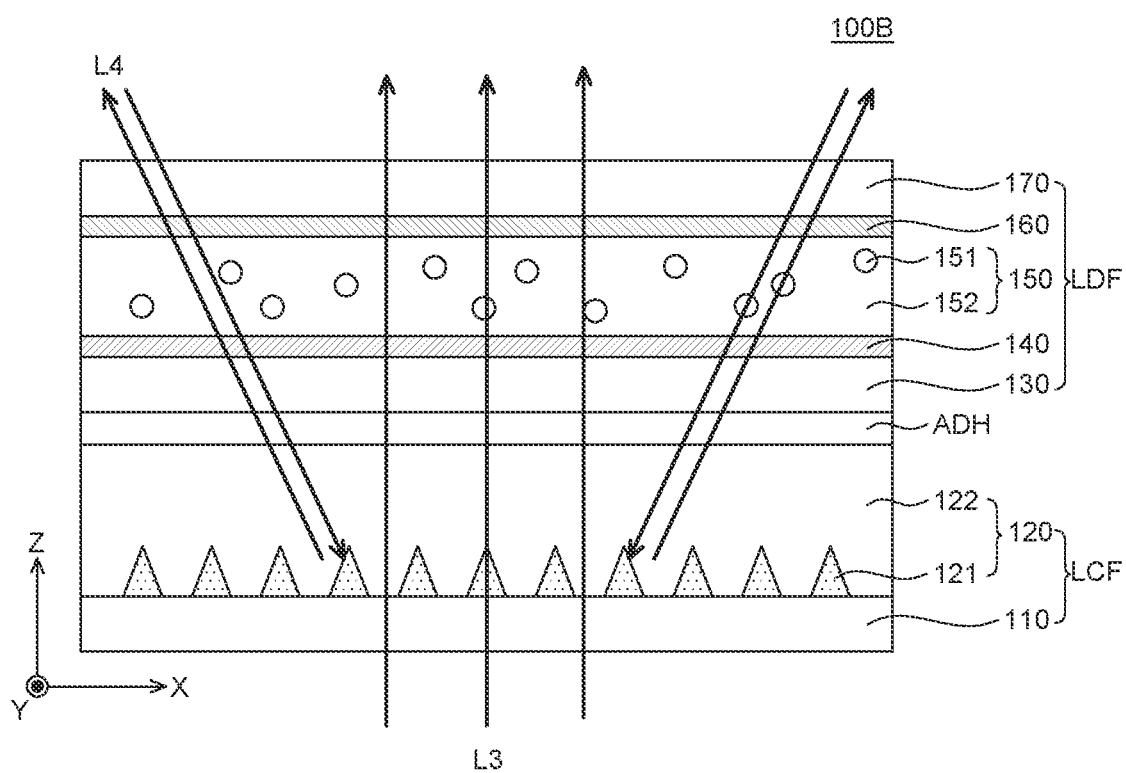

FIGS. 3A and 3B are cross-sectional views illustrating a share mode and a security mode when driving a privacy protection film according to an exemplary embodiment of the present disclosure. Specifically, FIG. 3A is a view for describing a share mode implemented when no voltage is applied to the first electrode and the second electrode, and FIG. 3B is a view for describing a security mode implemented when a voltage is applied to the first electrode and the second electrode.

Referring to FIG. 3A, a privacy protection film 100A is operated in a share mode. When no voltage is applied to the first electrode 140 and the second electrode 160, liquid crystal molecules inside the droplets 151 dispersed in the polymer 152 in the variable light diffusion layer 150 are arranged irregularly. Light can be refracted and diffused by the droplets 151 including liquid crystal molecules due to a difference in refractive index between the liquid crystal molecules and the polymer 152.

For example, internal light L1 emitted from the backlight unit BLU disposed under the privacy protection film 100A goes through the light control layer 120 and is incident onto the variable light diffusion layer 150. The internal light L1 emitted by the backlight unit BLU can pass straight through an area where the optical pattern structures 121 of the light control layer 120 are not disposed. In addition, the internal light L1 emitted from the backlight unit BLU can go through the optical pattern structures 121 of the light control layer 120. As described above with reference to FIG. 1B, when the taper angle of the optical pattern structure 121 is 3° to 15°, the refraction of the internal light L1 emitted from the backlight unit BLU is minimized, and the internal light L1 emitted from the backlight unit BLU can pass through the optical pattern structure 121. The internal light L1 having passed through the light control layer 120 collides with the droplets 151 of the variable light diffusion layer 150. In the share mode, due to the difference in refractive index between the liquid crystal molecules included in the droplets 151 and the polymer 152, the light L1 colliding with the droplets 151 is scattered or refracted.

Meanwhile, external light L2 is incident on the privacy protection film 100A from the outside of the liquid crystal display device 1000. A portion of external light L2 incident from the outside of the liquid crystal display device 1000 collides with the droplets 151 of the variable light diffusion layer 150. The external light L2 colliding with the droplets 151 can be refracted and diffused in directions different from an incident direction. A portion of the external light L2 colliding with the droplets 151 can be refracted into the variable light diffusion layer 150 to thereby collide with another droplet 151 again. Another portion of the external light L2 colliding with the droplets 151 can be incident on the inside of the light control layer 120, and another portion of the external light L2 can be directly reflected to the outside of the liquid crystal display device 1000. At this time, refracted light incident on the inside of the light control layer 120 can be reflected by the optical pattern structure 121 and incident onto the inside of the variable light diffusion layer 150, again. Therefore, direct reflection of external light can be reduced in the share mode.

Therefore, in the share mode, the internal light L1 emitted from the backlight unit BLU is diffused outwardly by the variable light diffusion layer 150, and the external light L2 incident from the outside of the liquid crystal display device 1000 can be diffused by the variable light diffusion layer 150, so that reflection by the light control layer 120 can be reduced. Through this, the privacy protection film 100A illustrated in FIG. 3A can provide a wide viewing angle so that an image can be seen by not only a user but also other people around the user.

Referring to FIG. 3B, the privacy protection film 100B is operated in a security mode. When a voltage is applied to the first electrode 140 and the second electrode 160, the liquid crystal molecules inside the droplets 151 dispersed in the polymer 152 in the variable light diffusion layer 150 are uniformly aligned in an electric field direction. Accordingly, the refractive index of the liquid crystal molecules is changed and coincides with the refractive index of the polymer which is selected in advance, so that light can pass through the variable light diffusion layer 150.

For example, internal light L3 emitted from the backlight unit BLU disposed under the privacy protection film 100B goes through the light control layer 120 and is incident on the variable light diffusion layer 150. The internal light L3 incident on the variable light diffusion layer 150 can pass straight through the variable light diffusion layer 150 without being refracted and diffused.

Meanwhile, external light L4 incident from the outside of the liquid crystal display device 1000 can also go through the variable light diffusion layer 150 without being refracted and diffused. External light L4 incident at an incident angle equal to or greater than a predetermined angle among the external light L4 incident from the outside of the liquid crystal display device 1000 passes through the variable light diffusion layer 150, is reflected by the side surfaces of the optical pattern structures 121 disposed in the light control layer 120 and then, emitted again to the outside of the liquid crystal display device 1000. That is, when the display device is viewed at a viewing angle equal to or greater than a predetermined angle, reflected light by the optical pattern structures 121 is visible, and the internal light L3 emitted from the backlight unit BLU is not visible. That is, by the optical pattern structures 121, reflective visibility is recognized at a specific angle or more to thereby implement a security mode. On the other hand, a viewing angle is determined by geometrical parameters such as the height H, the width W, the interval P, and the taper angle of the optical pattern structures 121.

Therefore, in the security mode, the light L3 emitted from the backlight unit BLU can passes through the variable light diffusion layer 150 without refraction and scattering by the liquid crystal molecules aligned by an electric field formed in the variable light diffusion layer 150. The external light L4 incident at an incident angle equal to or greater than a predetermined angle from the outside of the liquid crystal display device 1000 passes through the variable light diffusion layer 150 and then, is reflected again outwardly by the optical pattern structures 121 of the light control layer 120. Through this, a user located on the front of the liquid crystal display device 1000 can view an image, and other people around the user, located at a viewing angle equal to or greater than a predetermined angle recognize reflective visibility and thus, cannot view the image.

Figure 4:
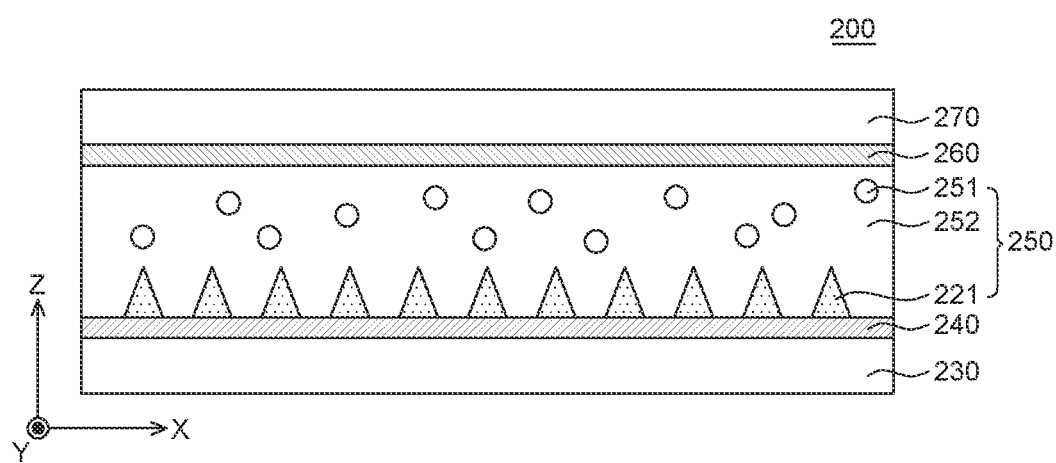
FIG. 4 is a cross-sectional view illustrating a privacy protection film according to another exemplary embodiment of the present disclosure.

FIG. 4 is a cross-sectional view illustrating a privacy protection film according to another exemplary embodiment of the present disclosure.

Referring to FIG. 4, a privacy protection film 200 according to another exemplary embodiment of the present disclosure includes a first substrate 230, a second substrate 270, a first electrode 240, a second electrode 260, and a variable light diffusion layer 250 disposed between the first electrode 240 and the second electrode 260. The variable light diffusion layer 250 includes optical pattern structures 221, a polymer 252, and droplets 251 including liquid crystals. Other configurations of the privacy protection film 200 according to another exemplary embodiment of the present disclosure shown in FIG. 4 are substantially the same as those of the privacy protection film 100 according to an exemplary embodiment of the present disclosure shown in FIG. 1B, with the exception that the light control film LCF is omitted and the variable light diffusion layer 150 formed of the polymer dispersed liquid crystal (PDLC) and the optical pattern structures 121 are formed in the same layer.

Referring to FIG. 4, the first substrate 230 and the second substrate 270 are spaced apart from each other at a certain interval and disposed to face each other. Since the first substrate 230 and the second substrate 270 are substantially the same as the first substrate 130 and the second substrate 170 constituting the privacy protection film 100 shown in FIG. 1B, redundant descriptions are omitted.

The first electrode 240 is disposed on the first substrate 230, and the second electrode 260 is disposed on a lower surface of the second substrate 270. Since the first electrode 240 and the second electrode 260 are substantially the same as the first electrode 140 and the second electrode 160 constituting the privacy protection film 100 illustrated in FIG. 1B, redundant descriptions are omitted.

The variable light diffusion layer 250 is disposed between the first electrode 240 and the second electrode 260. The variable light diffusion layer 250 controls whether to diffuse or refract light that goes through the privacy protection film 200, and a degree of the diffusion and refraction. At the same time, the variable light diffusion layer 250 implements structural coloration or reflective visibility. More specifically, the variable light diffusion layer 250 controls the diffusion and straight movement of the internal light emitted from the backlight unit and the external light incident from the outside of the liquid crystal display device. In addition, the variable light diffusion layer 250 can reflect external light incident at an incident angle equal to or greater than a predetermined angle from the outside of the liquid crystal display device, so as to implement structural coloration or reflective visibility at a specific viewing angle.

The variable light diffusion layer 250 includes the optical pattern structures 221, the polymer 252, and the droplets 251 including liquid crystals. Specifically, the variable light diffusion layer 250 is formed of a polymer dispersed liquid crystal (PDLC) including the polymer 252 filling a space between the first electrode 240 and the second electrode 260 and the droplets 251 including liquid crystal molecules dispersed in the polymer 252. At this time, since the polymer 252 and the droplets 251 containing liquid crystal molecules included in the variable light diffusion layer 250 are substantially the same as the polymer 152 and the droplets 151 containing liquid crystal molecules constituting the privacy protection film 100 shown in FIG. 1B, redundant descriptions are omitted.

The optical pattern structures 221 are disposed on the first substrate 230. Unlike the privacy protection film 100 in FIG. 1B in which the optical pattern structures are configured as a separate layer and disposed on the base substrate, the optical pattern structures in the privacy protection film 200 according to another exemplary embodiment of the present disclosure are disposed within the variable light diffusion layer 250 formed of the polymer dispersed liquid crystal (PDLC). Since a concrete shape of the optical pattern structures 221 is substantially the same as that of the optical pattern structures 121 constituting the privacy protection film 100 shown in FIG. 1B, redundant descriptions are omitted.

Hereinafter, effects of the present disclosure described above will be described in more detail through Examples. However, the following Examples are provided to exemplify the present disclosure, and the scope of the present disclosure is not limited by the following Examples.

Inventive Example 1

A privacy protection film having a structure in which a variable light diffusion film is stacked on a light control film shown in FIG. 1B was manufactured. At this time, the light control film includes pyramid-shaped optical pattern structures shown in FIG. 2A. The optical pattern structures have a height H of 200 nm, a width W of 100 nm, and an interval P of 100 nm. In addition, the variable light diffusion film has a structure in which a PDLC layer having a thickness of 20 µm is interposed between a first substrate and a second substrate that respectively have a thickness of 188 µm.

Inventive Example 2

A privacy protection film was manufactured in the same manner as in Inventive Example 1, except that truncated pyramid-shaped optical pattern structures, tops of which are cut-off, as shown in FIG. 2B were used. At this time, the optical pattern structures have a height H of 200 nm, a bottom surface width W of 100 nm, a top surface width d2 of 50 nm, and an interval P of 100 nm.

Experimental Example 1—Measurement of Reflectance According to a Viewing Angle

Light reflectance of the privacy protection film according to Inventive Example 1 at a viewing angle of 0° to 70° when driving a security mode and a share mode of the privacy protection film was measured, using CA-310 equipment. Measurement results are shown in FIG. 5.

Figure 5:
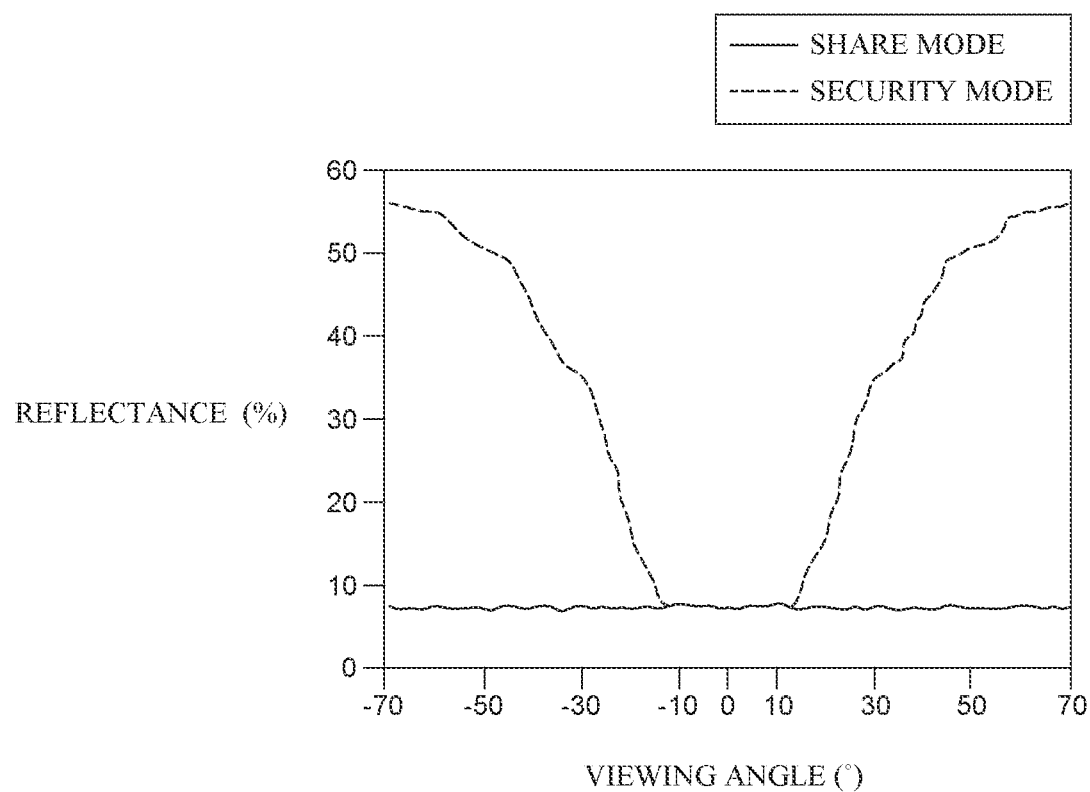
FIG. 5 is a graph showing plots of reflectance according to a change in viewing angle when driving a share mode and a security mode of the privacy protection film according to the exemplary embodiment of the present disclosure.

FIG. 5 is a graph showing plots of reflectance according to a change in viewing angle when driving the share mode and the security mode of the privacy protection film according to the exemplary embodiment of the present disclosure.

Referring to FIG. 5, in the share mode, low reflectance was constantly displayed at various viewing angles and accordingly, it could be confirmed that an image can be sufficiently recognized even at various viewing angles in the share mode. Meanwhile, in the security mode, when the viewing angle was 15 degrees or more, it was confirmed that the reflectance increases rapidly. Particularly, when the viewing angle was 30 degrees or more, the reflectance was about 30%, so that reflective visibility can be recognized at a side viewing angle. Accordingly, it was confirmed that the security mode in which surrounding people cannot recognize the image could be implemented.

The privacy protection film according to another exemplary embodiment of the present disclosure can provide the security mode by providing a narrow viewing angle so that an image displayed on the display device is visible only to a user through selectively adjusting a viewing angle according to the application of an electrical signal, and can provide the share mode that provides a wide viewing angle in such a manner that the image can be seen by other people surrounding the user. In addition, the privacy protection film according to another exemplary embodiment of the present disclosure can freely switch between the security mode and the share mode as needed. In addition, unlike a conventional privacy device that limits a viewing angle using light blocking or light absorption, the privacy protection film according to another exemplary embodiment of the present disclosure uses the variable light diffusion layer including the polymer dispersed liquid crystal and the optical pattern structures, so that specific reflective visibility can be felt at a viewing angle equal to or greater than a predetermined angle to thereby limit the viewing angle.

In particular, as compared to the privacy protection film according to an exemplary embodiment of the present disclosure shown in FIG. 1B, the privacy protection film according to another exemplary embodiment of the present disclosure, can allow for a reduction in an overall thickness thereof by integrating two functional layers into a single layer. Specifically, the base substrate and the adhesive member of the privacy protection film shown in FIG. 1B are deleted, and the light control layer and the variable light diffusion layer are integrated into a single layer, whereby the overall thickness of the privacy protection film according to another exemplary embodiment of the present disclosure can be reduced by the amount described above. For example, the privacy protection film illustrated in FIG. 4 has a thickness reduction effect of about 400 μm and a weight reduction effect, compared to the privacy protection film illustrated in FIG. 1B.

Moreover, the privacy protection film according to another exemplary embodiment of the present disclosure has improvements in overall transmittance. The privacy protection film illustrated in FIG. 4 has a reduced thickness compared to the privacy protection film illustrated in FIG. 1B, and thus, can be expected to have an effect of improving transmittance. In addition, since the number of layers constituting the privacy protection film is decreased, a phenomenon in which light emitted from the backlight unit is reflected back to the interior of the liquid crystal display device by reflection and refraction due to a difference in refractive index of the respective layers, can be minimized. That is, light transmission efficiency of the privacy protection film can be greatly improved.

The exemplary embodiments of the present disclosure can also be described as follows:

According to an aspect of the present disclosure, there is provided a privacy protection film. The privacy protection film comprises a transparent base substrate, a light control layer disposed on the transparent base substrate and including a plurality of optical pattern structures each having an upwardly protruding prism shape, a first electrode disposed on the light control layer, a second electrode spaced apart from the first electrode, and a variable light diffusion layer disposed between the first electrode and the second electrode and formed of a polymer dispersed liquid crystal (PDLC).

Each of the plurality of optical pattern structures can be formed of a transparent material.

Each of the plurality of optical pattern structures can have a pyramid shape or truncated pyramid shape formed of four inclined surfaces of which inclinations are identical.

Each of the plurality of optical pattern structures can be a rod-type prism having two inclined surfaces of which inclinations are identical and having a triangular cross-sectional shape, or a rod-type prism having two inclined surfaces of which inclinations are identical and having a trapezoidal cross-sectional shape.

Each of the plurality of optical pattern structures can have a height of 100 nm to 200 nm, a width of 100 nm to 200 nm, an interval of 100 nm to 200 nm, and a taper angle of 3° to 15°.

The light control layer further can include an auxiliary optical pattern part disposed on the optical pattern structures to planarize the optical pattern structures and having a refractive index less than that of the optical pattern structures.

The variable light diffusion layer can include a polymer and droplets dispersed in the polymer and including a plurality of liquid crystal molecules.

When a voltage is applied to the first electrode and the second electrode, the variable light diffusion layer can be transparent, and when no voltage is applied to the first electrode and the second electrode, the variable light diffusion layer can be opaque.

The variable light diffusion layer can have a thickness of 15 μm to 25 μm.

According to another aspect of the present disclosure, there is provided a privacy protection film. The privacy protection film comprises a first transparent substrate and a second transparent substrate facing the first transparent substrate, a first electrode on the first transparent substrate, a second electrode on a lower surface of the second transparent substrate, a plurality of optical pattern structures disposed on the first electrode and formed of a transparent material, a polymer filling a space between the first electrode and the second electrode, and droplets including liquid crystal molecules dispersed in the polymer.

Each of the plurality of optical pattern structures can have a pyramid shape or a truncated pyramid shape formed of four inclined surfaces of which inclinations are identical.

Each of the plurality of optical pattern structures can be a rod-type prism having two inclined surfaces of which inclinations are identical and having a triangular cross-sectional shape, or a rod-type prism having two inclined surfaces of which inclinations are identical and having a trapezoidal cross-sectional shape.

Each of the plurality of optical pattern structures can have a height of 100 nm to 200 nm, a width of 100 nm to 200 nm, an interval of 100 nm to 200 nm, and a taper angle of 3° to 15°.

A refractive index of the plurality of optical pattern structures can be greater than or equal to a refractive index of the polymer.

An interval between the first electrode and the second electrode can be 300 μm to 500 μm.

According to another aspect of the present disclosure, there is provided a liquid crystal display device. The liquid crystal display device comprises the privacy protection film, a backlight unit disposed under the privacy protection film, and a liquid crystal display panel disposed under the privacy protection film.

Although the exemplary embodiments of the present disclosure have been described in detail with reference to the accompanying drawings, the present disclosure is not limited thereto and can be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A privacy protection film, comprising:
 a first transparent substrate and a second transparent substrate facing the first transparent substrate;
 a first electrode on the first transparent substrate;
 a second electrode on a lower surface of the second transparent substrate; and
 a variable light diffusion layer disposed between the first electrode and the second electrode, the variable light diffusion layer comprising:
  a plurality of optical pattern structures disposed directly on the first electrode and formed of a transparent material;
  a polymer filling a space between the first electrode and the second electrode and covering the plurality of optical pattern structures; and
  droplets including liquid crystal molecules dispersed in the polymer,
 wherein each of the plurality of optical pattern structures has:
  a height of approximately 100 nm to 200 nm,
  a width of approximately 100 nm to 200 nm,
  an interval of approximately 100 nm to 200 nm, and
  a taper angle of approximately 3° to 15°.

2. The privacy protection film of claim 1, wherein when a voltage is applied to the first electrode and the second electrode, the variable light diffusion layer is transparent, and
 when no voltage is applied to the first electrode and the second electrode, the variable light diffusion layer is non-transparent or opaque.

3. The privacy protection film of claim 1, wherein each of the plurality of optical pattern structures has a pyramid shape or a truncated pyramid shape formed of four inclined surfaces having identical inclinations.

4. The privacy protection film of claim 1, wherein each of the plurality of optical pattern structures is one of the following:
 a rod-type prism having two inclined surfaces with identical inclinations, and having a triangular cross-sectional shape, or
 a rod-type prism having two inclined surfaces with identical inclinations, and having a trapezoidal cross-sectional shape.

5. The privacy protection film of claim 1, wherein a refractive index of the plurality of optical pattern structures is greater than or equal to a refractive index of the polymer.

6. The privacy protection film of claim 1, wherein an interval between the first electrode and the second electrode is approximately 300 μm to 500 μm.

7. A liquid crystal display device, comprising:
 the privacy protection film of claim 1;
 a backlight unit disposed under the privacy protection film; and
 a liquid crystal display panel disposed on the privacy protection film.

8. The liquid crystal display device of claim 7, wherein the backlight unit includes an optical sheet including a diffusion sheet and a prism sheet.

* * * * *